United States Patent
Ojima et al.

(10) Patent No.: US 7,180,543 B2
(45) Date of Patent: Feb. 20, 2007

(54) IMAGING APPARATUS, IMAGING METHOD AND RECORDING MEDIUM FOR MINIMIZING A RELEASE TIME LAG

(75) Inventors: Noriaki Ojima, Ohta-ku (JP); Tatsutoshi Kitajima, Ohta-ku (JP); Kohichi Sugiura, Ohta-ku (JP); Toshiaki Nakahira, Ohta-ku (JP); Akihiro Yoshida, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 10/764,449

(22) Filed: Jan. 27, 2004

(65) Prior Publication Data

US 2004/0252225 A1    Dec. 16, 2004

(30) Foreign Application Priority Data

Feb. 7, 2003   (JP) ............................. 2003-031678
Dec. 24, 2003  (JP) ............................. 2003-427668

(51) Int. Cl.
  *H04N 9/07*   (2006.01)
  *H04N 5/238*  (2006.01)

(52) U.S. Cl. ...................................... 348/296; 348/366

(58) Field of Classification Search ................ 348/296, 348/362, 363, 364, 365, 366, 367, 368
See application file for complete search history.

(56) References Cited

U.S. PATENT DOCUMENTS

| | | |
|---|---|---|
| 5,075,775 A | 12/1991 | Kawaoka et al. |
| 5,109,249 A | 4/1992 | Kitajima |
| 5,153,783 A | 10/1992 | Tamada et al. |
| 5,229,805 A | 7/1993 | Kitajima |
| 5,631,458 A | 5/1997 | Nakahira et al. |
| 5,682,563 A | 10/1997 | Shinohara et al. |
| 5,748,233 A | 5/1998 | Kitajima et al. |
| 5,767,904 A | 6/1998 | Miyake |
| 5,808,681 A | 9/1998 | Kitajima |
| 5,854,949 A | 12/1998 | Furukawa et al. |
| 5,937,100 A | 8/1999 | Kitajima |
| 6,075,562 A | 6/2000 | Sakaguchi et al. |

(Continued)

FOREIGN PATENT DOCUMENTS

JP     04281684 A   *  10/1992

(Continued)

*Primary Examiner*—Vivek Srivastava
*Assistant Examiner*—Justin Misleh
(74) *Attorney, Agent, or Firm*—Oblon, Spivak, McClelland, Maier & Neustadt, P.C.

(57) ABSTRACT

An imaging apparatus including a device for discharging charge or F/E-IC for discharging charge accumulated in an imaging device or CCD and for canceling exposure in a discharging term of the charge. The apparatus also includes a light shielding device or mechanical shutter unit for a mechanical shutter, which shields light by the mechanical shutter, and a control device or CPU block for controlling the discharging term of the discharging device and the light shielding timing of the mechanical shutter. The charge discharging term of the CCD in the discharging device is shortened and a light shielding timing of the mechanical shutter in the light shielding device is hastened by the control device or CPU block, when a computer exposure time computed by the control device or CPU block for recording a subject is shorter than an image recording term of one frame.

6 Claims, 11 Drawing Sheets

U.S. PATENT DOCUMENTS

| | | | |
|---|---|---|---|
| 6,157,406 A * | 12/2000 | Iura et al. | 348/220.1 |
| 6,243,136 B1 * | 6/2001 | Sasaki | 348/362 |
| 6,614,477 B1 | 9/2003 | Lee et al. | |
| 6,657,671 B1 * | 12/2003 | Sasaki | 348/367 |
| 6,700,610 B1 | 3/2004 | Kijima et al. | |
| 6,888,570 B1 * | 5/2005 | Yoshida | 348/296 |
| 6,947,089 B1 * | 9/2005 | Hori | 348/312 |
| 2003/0030737 A1 * | 2/2003 | Yanai | 348/296 |
| 2003/0030740 A1 * | 2/2003 | Tsujino | 348/333.01 |
| 2003/0048371 A1 | 3/2003 | Oda | |
| 2003/0086005 A1 * | 5/2003 | Nakamura | 348/223.1 |
| 2003/0098917 A1 * | 5/2003 | Oda | 348/272 |
| 2003/0128279 A1 * | 7/2003 | Suzuki | 348/221.1 |

FOREIGN PATENT DOCUMENTS

| | | |
|---|---|---|
| JP | 2624982 | 6/1997 |
| JP | 2624983 | 6/1997 |
| JP | 2002-290823 | 10/2002 |

* cited by examiner

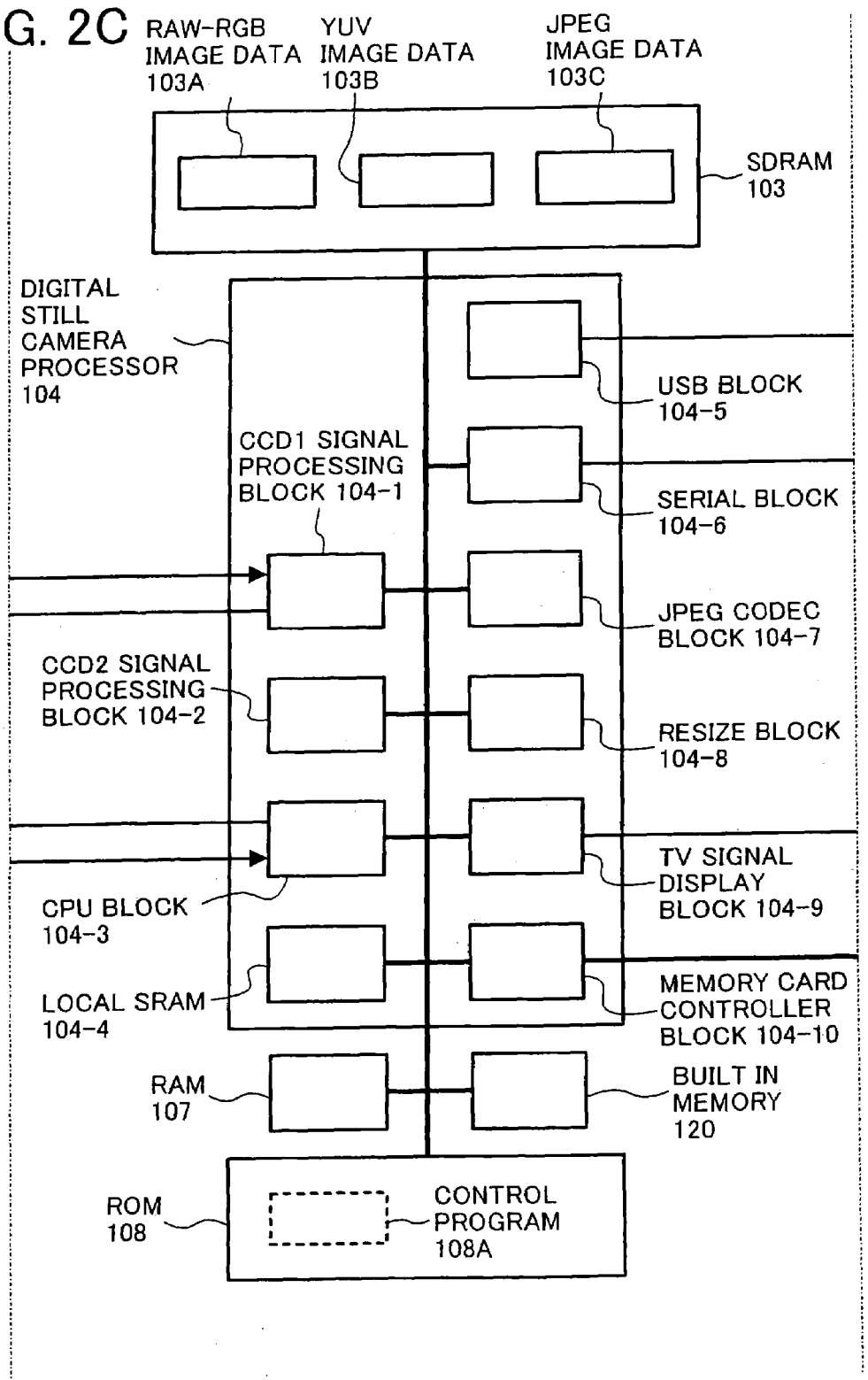

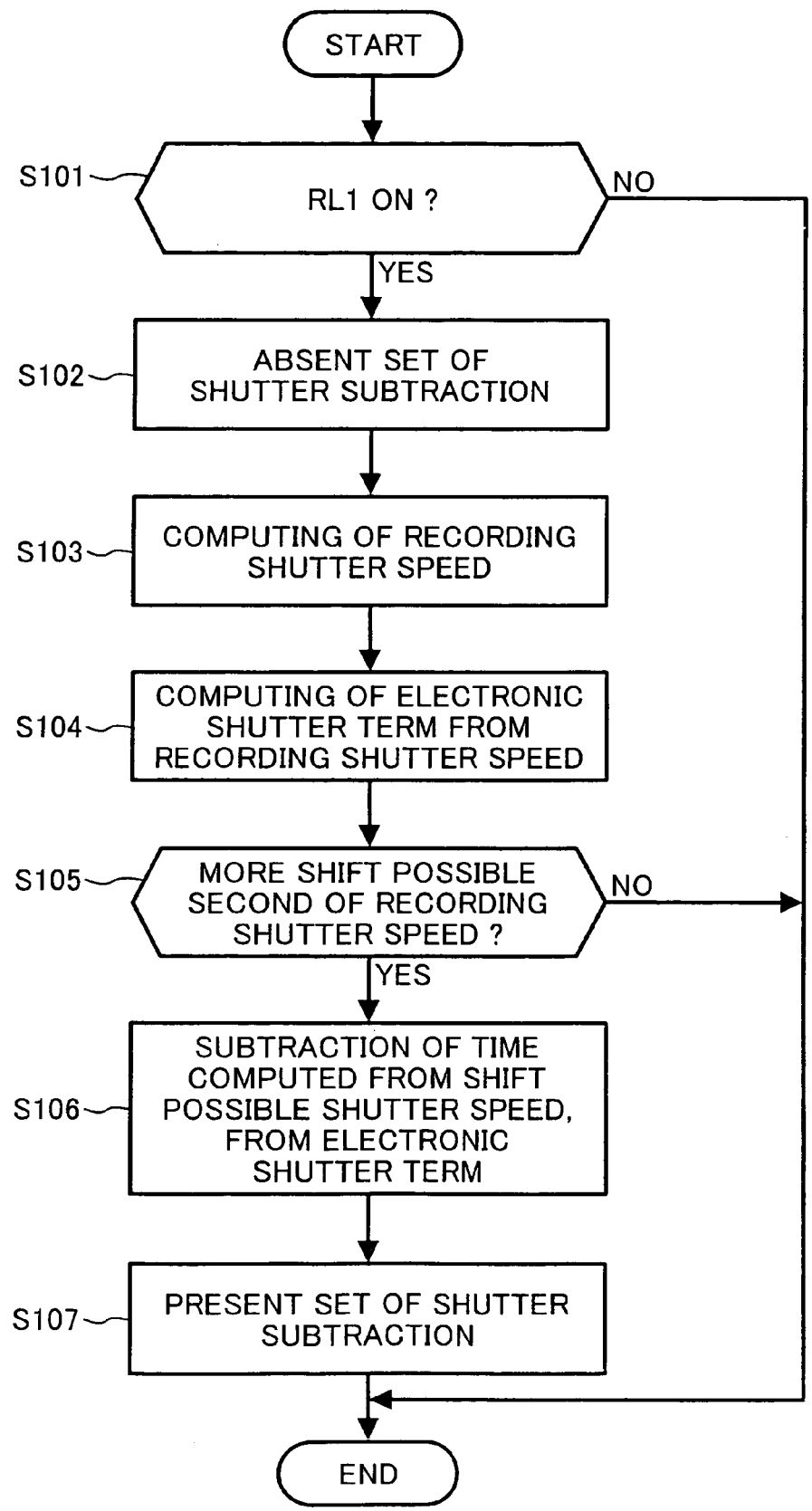

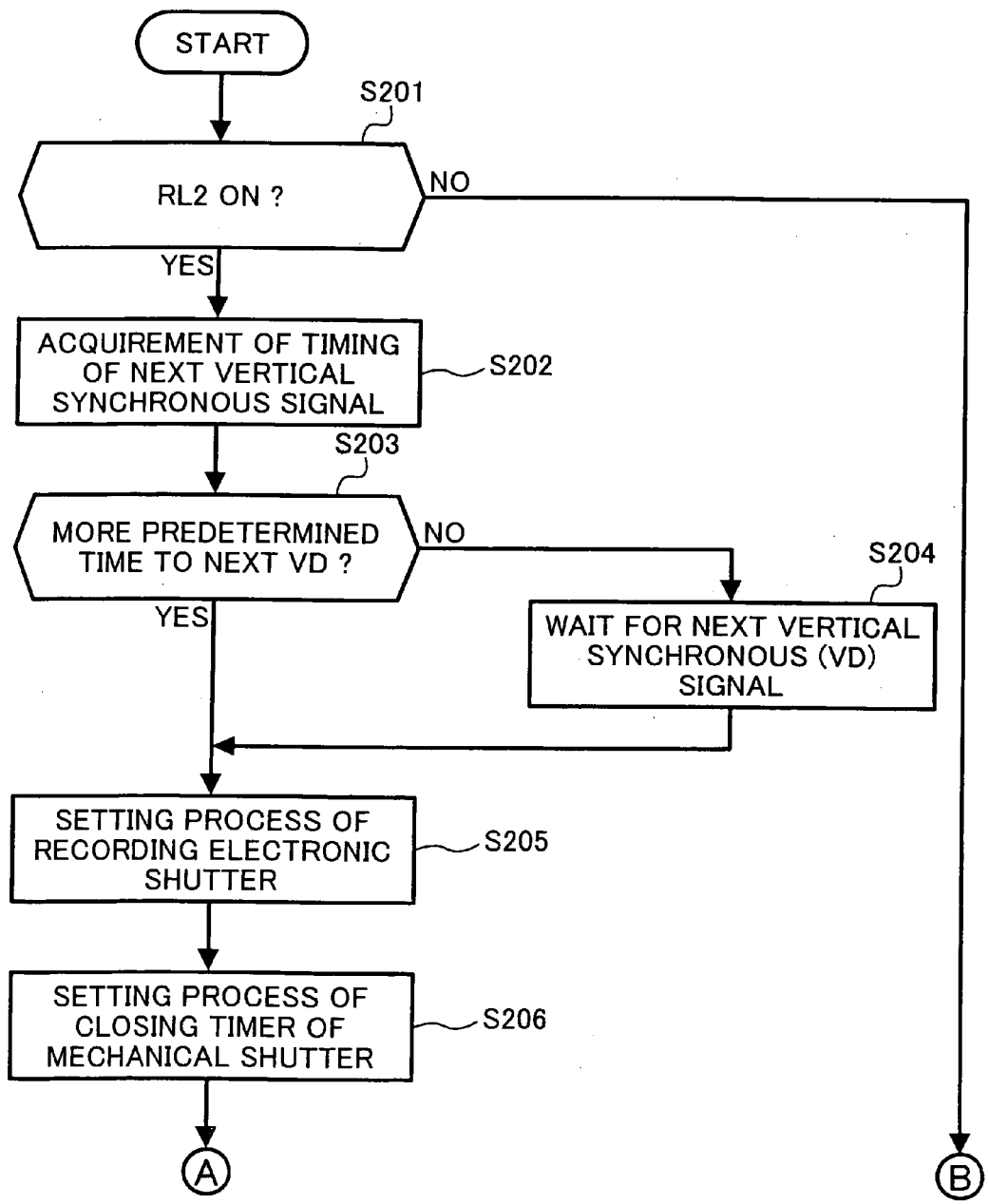

IMAGING APPARATUS, IMAGING METHOD AND RECORDING MEDIUM FOR MINIMIZING A RELEASE TIME LAG

BACKGROUND OF THE INVENTION

1. Field of the Invention

The present invention relates to an imaging apparatus, an imaging method and a recording medium capable of minimizing a time (hereinafter referred to as release time lag) until an actual exposure is initiated, after a release shutter button is pressed.

2. Description of the Prior Art

Generally, means for controlling an exposure time of an imaging device or a light-receiving device such as a CCD are classified in the following two kinds in a digital camera.

One is a mechanical shutter for shielding physically radiation of light from a field of a subject. Another is an element shutter or electronic shutter substituted for the mechanical shutter by switching energization of the imaging device.

These shutters of the two kinds are mainly used for the purpose of shielding light in an interlace scan system. This is for a reason that during scanning certain scanning lines of a plurality of scanning lines in order to read out the plurality of scanning lines sequentially, it is necessary to completely shield light from the subject field not to receive pixels constituting the other scanning lines than the above scanned lines, in the interlace scan system.

An amount of receiving light is not different between pixels even though light shielding is not carried out during scanning as the aforementioned interlace scan system in order to read out the entire pixels at once in a progressive scan system, but, there is a case being be shielded by the mechanical shutter in recording a still image because of possibility of generation of a smear by a strong photoelectric during reading out a signal charge.

On the other hand, the electronic shutter causes a signal charge stored in the imaging device to remove in a direction of substrate by means of a Vertical Overflow Drain. With this structure, an exposure can be initiated from a state in which the signal charge of the imaging device becomes zero.

Comparing the electronic shutter with the mechanical shutter from the view of shutter speed, the electronic shutter makes it possible to accomplish a rapid shutter having a speed of over 1/10000 seconds, whereas the maximum of shutter speed of the mechanical shutter is a degree of 1/500 seconds in case of a low cost lens shutter used in a compact camera, because the mechanical shutter requires a time from initiation of shielding to completion of shielding because of a delay on a mechanism.

Therefore, it has been proposed to use a combination of the electronic and mechanical shutters to eliminate the delay of shutter speed of the mechanical shutter while having an advantageous effect thereof.

For example, the initiation of exposure is carried out through an electronic shutter and completion of exposure is carried out through a mechanical shutter, as shown in Japanese Patent Nos. 2624982 and 2624983. In addition, an error due to a delay by the mechanical shutter is compensated by micro-adjustment of the electronic shutter.

However, in the prior art as described above, even though an exposure mode is established by a blanking term or the like being completed, there is a problem that there is a time lag resulting from the micro-adjustment of the electronic shutter until an actual exposure is initiated and therefore it is not possible to photograph an subject moving with a super high speed, for example.

Therefore, in order to resolve such a problem, there is known an imaging apparatus and an imaging method in which an exposure is initiated with a less time lag or without a time lag from a shift to an exposure mode (for example, see Japanese Patent Laid-Open 2002-290823).

In the art of shortening the time lag, when a release shutter button is half-pressed, photometry is carried out through a control part for computing an exposure to determine an exposure time. In addition, the release shutter button is then full-pressed to be switched from a movie mode to an exposure mode by a timing signal generating part.

Consequently, a driver part imparts fixed output pulses of one or more times in the electronic shutter to a photographing part to initiate an exposure from a fixed time. Moreover, a system control part is adapted to control an AE adjusting part to close the mechanical shutter simultaneously with the completion of the exposure time obtained by the photometry.

In this way, in the prior art, the release time lag is minimized by adjustment of the amount of exposure by the mechanical shutter, after the removal of charge from the imaging device is carried out through the electronic shutter with a short time.

However, in this method, an exposure accuracy and maximum in a case that the shutter speed or a time required from the open to the close of the shutter is high depend on a closing accuracy and maximum of the mechanical shutter.

As a result, there is a problem that the maximum of control in a high shutter speed becomes low in the prior art.

In this way, when the shutter speed is high, the exposure time for recording an image becomes short.

It is possible to rapid the exposed time by shifting a period of the electronic shutter or a timing of the mechanical shutter if the exposure time is less than about half of a vertical synchronous signal representing a recording term of one frame.

SUMMARY OF THE INVENTION

It is, therefore, an object of the present invention to provide an imaging apparatus capable of minimzing a release time lag and having a low cost by setting highly the maximum of control in a high shutter speed.

Specifically, the present invention intends to provide an imaging apparatus in which when a shutter speed for recording a subject is more than a predetermined time, an electronic shutter term is shifted and then a timing of a mechanical shutter is started to shorten a release time lag totally.

To accomplish the above object, the imaging apparatus according to the present invention comprises a charge discharging device for canceling an exposure in a discharging term by discharging a charge accumulated in an imaging device; a light shielding device for shielding light by a mechanical shutter; a control device for expediting said discharging term for discharging the charge and a shielding timing of said mechanical shutter by a predetermined time when a shutter speed for recording a subject is more than a predetermined time.

The imaging apparatus causes a timing of the mechanical shutter to initiate after the time of shifting a term of the electronic shutter when the shutter speed recording the subject is more than a predetermined time (second of shutter).

As a result, the present invention makes it possible to shorten a release time lag and to prevent an upper limit in a high shutter speed from being limited owing to a performance of the mechanical shutter.

BRIEF DESCRIPTION OF THE DRAWINGS

FIG. 2C is a partially enlarged explanatory view of a portion shown by C1 in FIG. 2.

FIG. 3 is a flow chart explaining a computing processing in a term of an electronic shutter for recording a subject.

DETAILED DESCRIPTION OF THE PREFERRED EMBODIMENTS

An embodiment of the present invention will be explained with reference to the accompanying drawings below.

It should be noted that the present invention is not limited to the embodiment, and various modification and changes can be made with respect to the embodiment.

Figure 1A:
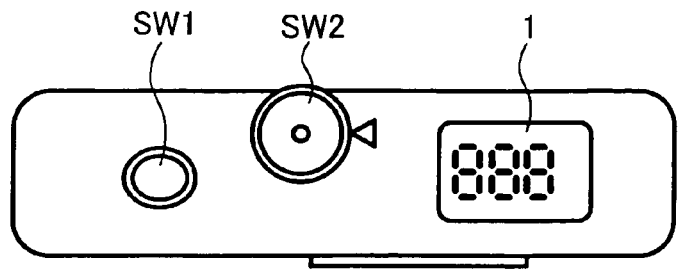
FIG. 1A is a plane view of a digital camera showing one example of an imaging apparatus according to the present invention.
Figure 1B:
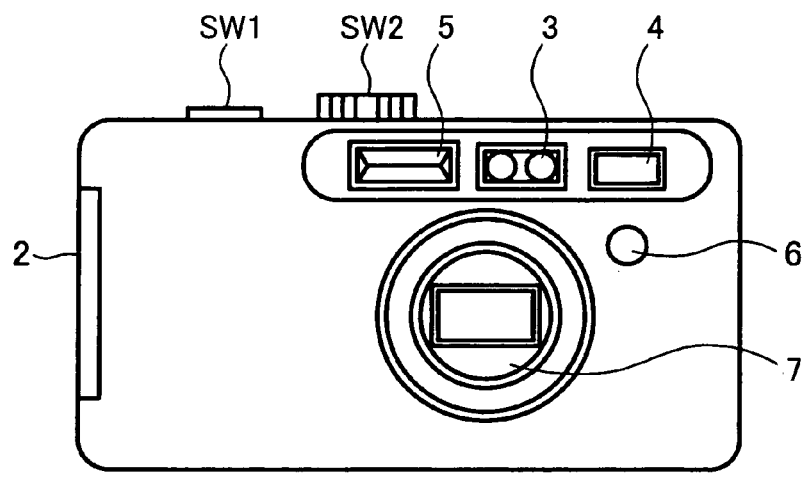
FIG. 1B is a front view of the digital camera shown in FIG. 1A.

Referring to FIGS. 1A and 1B, a digital camera is shown as one example of an imaging apparatus according to the present invention.

As shown in FIG. 1A, a release shutter SW1, a mode dial SW2 and a sub LCD 1 are provided on a top surface of the digital camera. Also, as shown in FIG. 1B, a SD card and a battery lid 2, a ranging unit 3, an optical finder 4, a strobe light emitting part 5, a remote control light receiving part 6 and a lens barrel unit 7 are provided on a front surface of the digital camera.

Figure 1C:
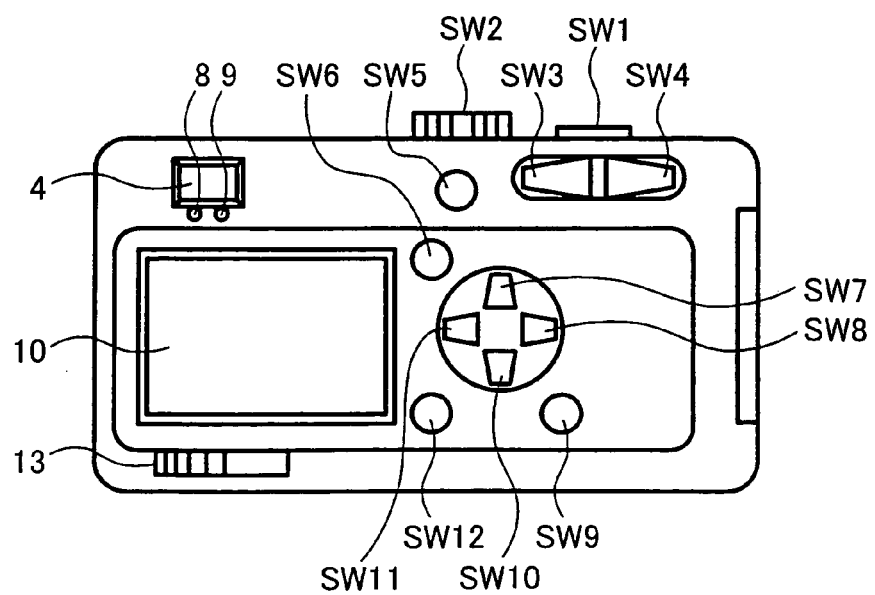
FIG. 1C is a back view of the digital camera shown in FIG. 1A.

Further, as shown in FIG. 1C, an AF LED 8, a strobe LED 9 and a LCD monitor 10 are provided on a back surface of the digital camera. In addition, provided on the back surface of the digital camera are a zoom switch SW3 shifting to a WIDE, a zoom switch shifting to a TELE, a self timer and canceling switch SW5, a menu switch SW6, an upper strobe switch SW7, a right switch SW8, a display switch SW9, a lower macro switch SW10, a left image confirming switch SW11, an OK switch SW12 and a power source switch 13.

Figure 2:
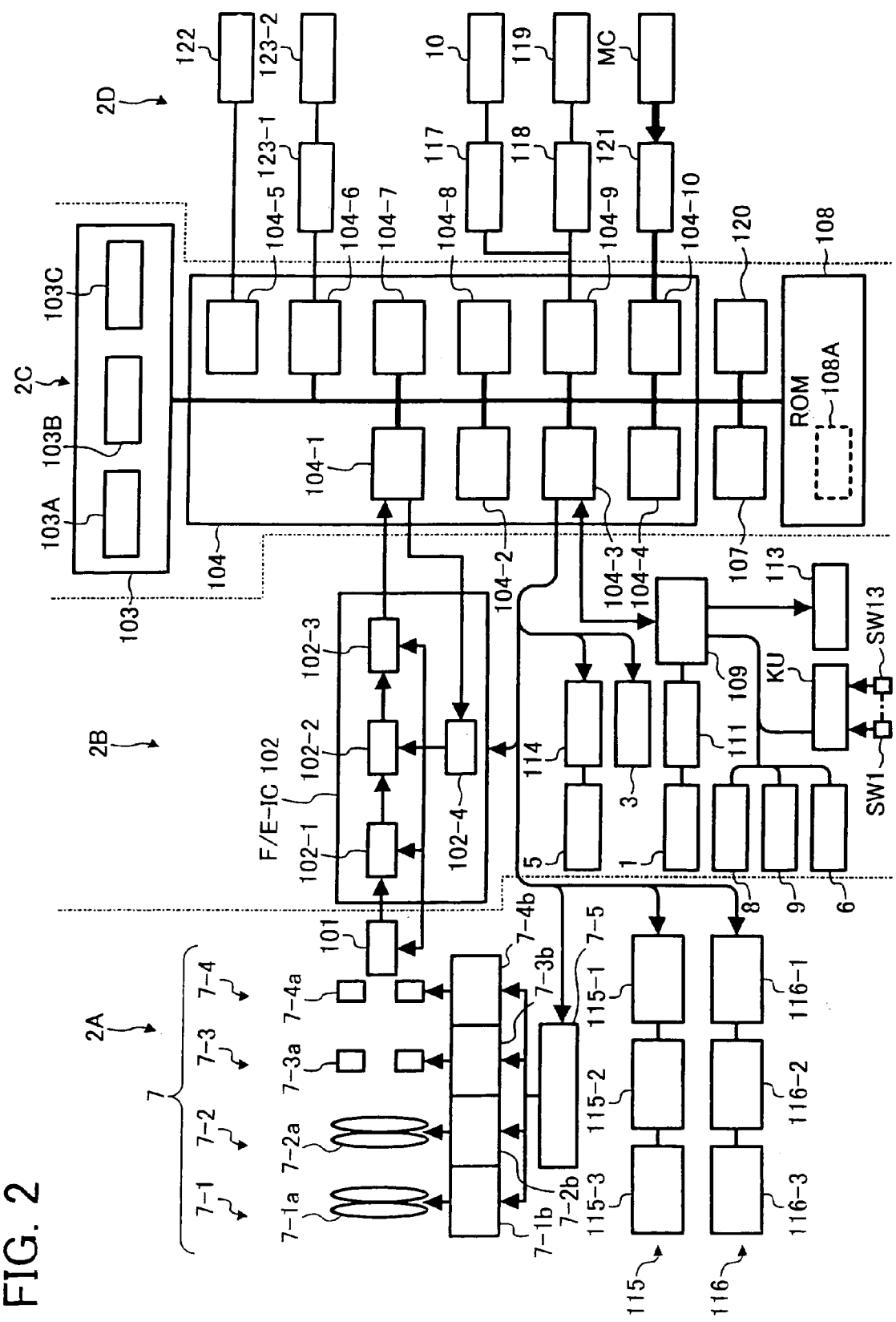
FIG. 2 is a block view of the digital camera, which is one example of the imaging apparatus.
Figure 2A:
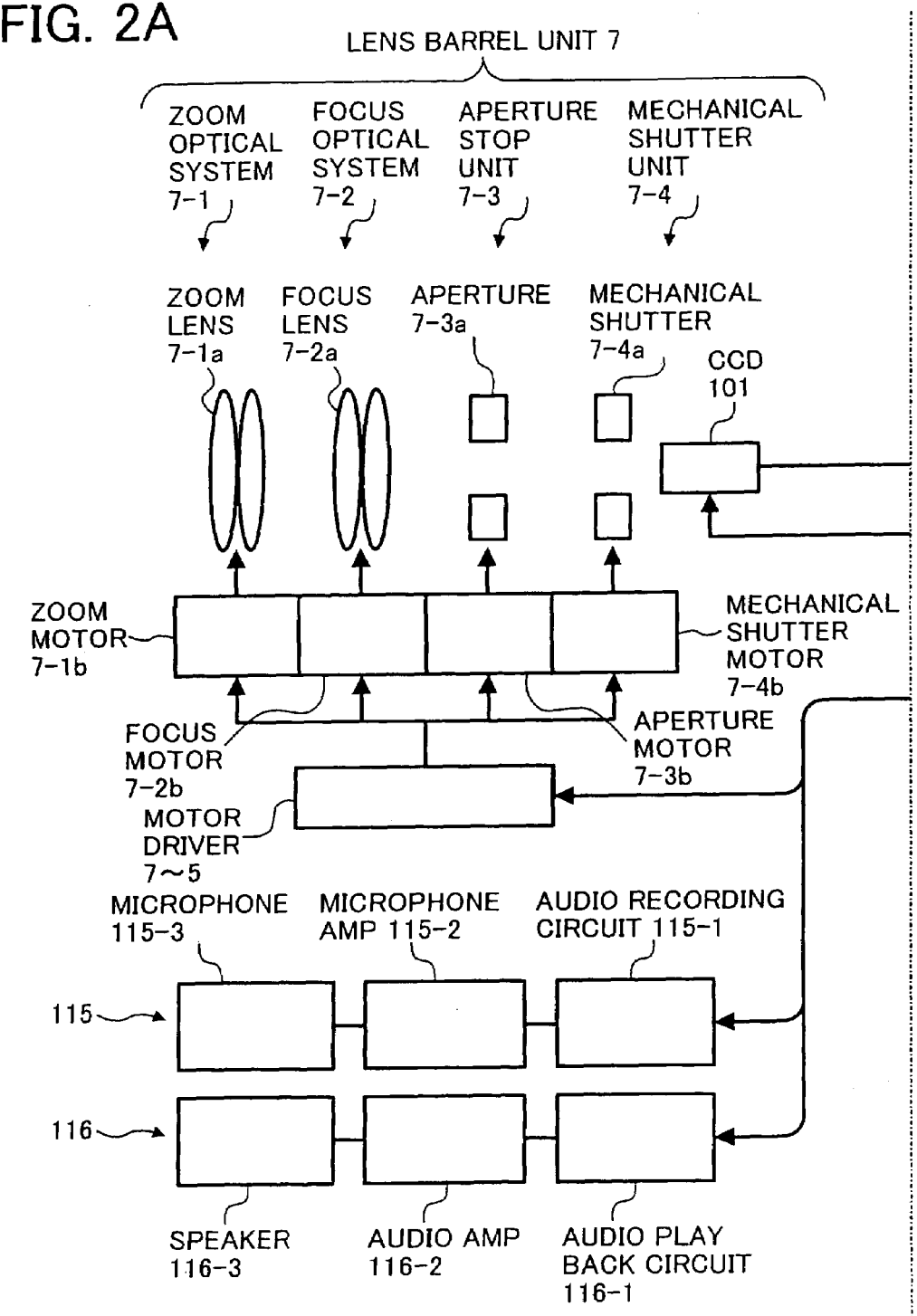
FIG. 2A is a partially enlarged explanatory view of a portion shown by A1 in FIG. 2.
Figure 2B:
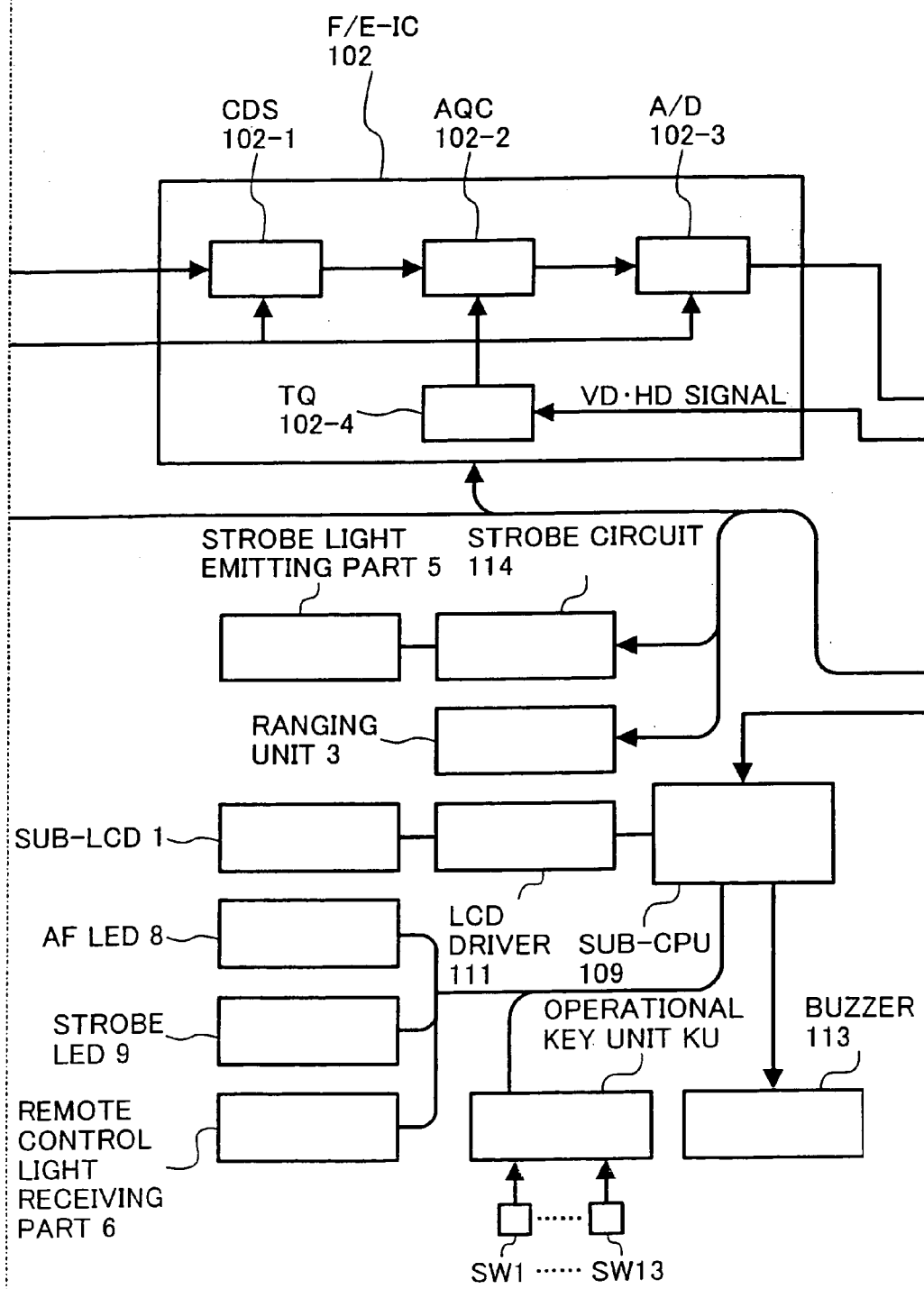
FIG. 2B is a partially enlarged explanatory view of a portion shown by B1 in FIG. 2.
Figure 2D:
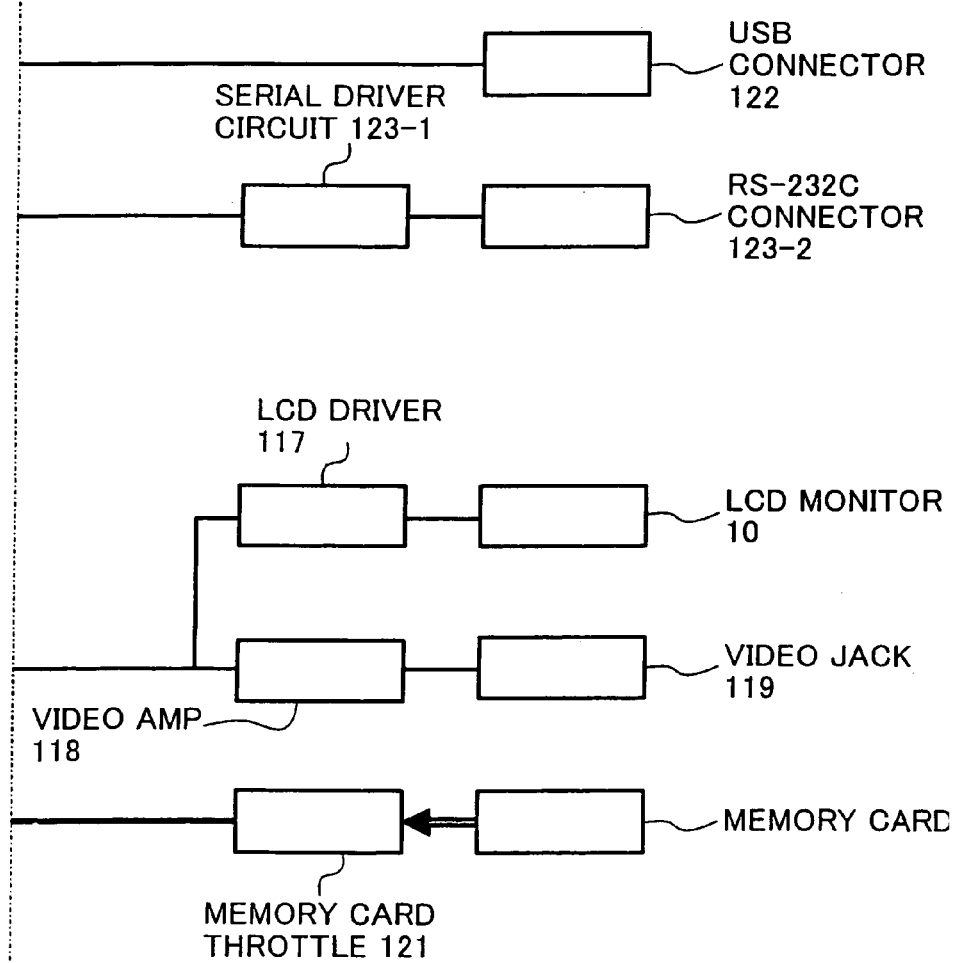
FIG. 2D is a partially enlarged explanatory view of a portion shown by D1 in FIG. 2.

FIGS. 2 to 2D illustrate blocks of the digital camera. In FIG. 2, a description of title and so on of each block is omitted for the sake of convenience of illustration.

First, an operation of the digital camera will be explained referring to FIGS. 1, 2 and 2A to 2D, below.

The lens barrel unit 7 includes a zoom optical system 7-1, a focus optical system 7-2, an aperture stop unit 7-3 and a motor driver 7-5. The zoom optical system 7-1 has a zoom lens 7-1a for picking up an optical image of a subject and a zoom drive motor 7-1b for driving the zoom lens 7-1a. The focus optical system 7-2 has a focus lens 7-2a and a focus drive motor 7-2b for driving the focus lens 7-2a.

The aperture stop unit 7-3 includes an aperture stop 7-3a and a an aperture stop motor 7-3b for driving the aperture stop 7-3a. Moreover, the mechanical shutter unit 7-4 includes a mechanical shutter 7-4a and a mechanical shutter motor 7-4b for driving the mechanical shutter 7-4a. The motor driver 7-5 is adapted to drive the zoom drive motor 7-1b, focus drive motor 7-2b, aperture stop motor 7-3b and mechanical shutter motor 7-4b.

As shown in FIGS. 2 and 2C, a CPU block 104-3 is provided in a digital still camera processor 104. In addition, an input signal inputted into the remote control light receiving part 6 from a remote control (not shown) or an operational signal from an operational key unit KU for the switches SW1 to SW13 and so on are inputted into the CPU block 104-3. The CPU block 104-3, also, controls and drives the motor driver 7-5 based on the signals inputted therein as described above.

Stored in the ROM 108 shown in FIGS. 2 and 2C are a control program 108A described with a code readable in the CPU block 104-3 and parameters for controlling the ROM. When the power source of the digital camera is turned on, the program is loaded in a main memory, which is not shown.

In addition, the CPU block 104-3, when the control program 108A of the ROM 108 is loaded in the main memory, controls the operation of each of the devices pursuant to the control program 108A and storages temporarily data and so on required to control in a RAM 107 and a Local SRAM 104-4 located in a digital still camera processor 104, which will be described hereinafter.

It is possible to change the control program 108A and parameters for controlling by use of a re-writable flash ROM in the ROM 108 to accomplish an upgrade of the function of the apparatus easily.

The CCD 101 as shown in FIGS. 2 and 2B is composed of a solid-state image-sensing device for converting an optical image into a photoelectrical signal. A F/E (front end)-IC 102 comprises a CDS 102-1 for carrying out correlation double samplings for removing an image noise, an AGC 102-2 for carrying out an adjustment of gain, an A/D 102-3 for carrying out a conversion to a digital signal and a TG 102-4 for generating a driving timing signal of the F/E-IC 102.

The F/E (front end)-IC 102 is controlled by means of the CPU block 104-3 as shown in FIGS. 2 and 2C. Vertical and horizontal synchronous (hereinafter referred to as VD and HD) signals are supplied through the F/E (front end)-IC 102 controlled by the CPU block 104-3 to the CCD 101 which corresponds to the solid-state image sensing device from the CCD 1 control block 104-1 which corresponds to a signal processing block for the CCD 1.

The digital still camera processor 104 includes the CCD 1 control block 104-1 as the CCD 1 signal processing block, a CCD 2 control block 104-2 as a CCD 2 signal processing block, the CPU block 104-3, the Local SRAM 104-4, a USB block 104-5, a serial block 104-6, a JPEG CODEC block 104-7, a RESIZE block 104-8, a TV signal display block 104-9, a memory card block 104-10 and so on, as shown in FIGS. 2 and 2C.

The aforementioned CCD 1 control block 104-1 performs white balance and gamma settings with respect to output data from the CCD 101 to the F/E-IC 102, and constitutes a circuit for supplying the VD and HD signals, as described above.

The CCD 2 control block 104-2 constitutes a circuit for performing conversion to brightness and color-difference date through a filtering process. Further, the CPU block 104-3 is an arithmetic control circuit or arithmetic control device for controlling an operation of each part of the apparatuses as described above, and the Local SRAM 104-4 is adapted to store temporarily date and so on necessary to the control as described above.

The USB block 104-5 corresponds to a communication control circuit for performing a UBS communication with an outside device such as a personal computer and the serial block 104-6 corresponds to a communication control circuit for performing a serial communication with an outside device such as a personal computer.

The JPEG CODEC block 104-7 is a circuit for performing JPEG compression/extension and the RESIZE block 104-8 is a circuit for performing enlargement/reduction of a size of the image data through an interpolating process.

The TV signal display block 104-9 is a circuit for converting the image data into video signals which are displayed on an outside display device such as a liquid crystal monitor or TV or the like and the memory card block 104-10 corresponds to a circuit for performing a control of a memory card MC) recording the image data as photographed.

The SDRAM 103 stores temporarily the image data in applying various processes to the image data by the digital still camera processor 104 as described above. The stored image data correspond to, for example, RAW-RGB image data 103A, YUV image data 103B, JPEG image data and so on, as shown in FIGS. 2 and 2C.

The RAW-RGB image data 103A correspond to image data which are inputted in the CCD 1 signal processing block 104-1 through the F/E-IC 102 from the CCD 101, and which is adapted to carry out the white balance and gamma settings in the CCD 1 signal processing block 104-1. The YUV image data 103B correspond to image data in which conversion for the brightness and color-difference data is carried out by means of the CCD 2 control block 104-2. The JPEG image data 103C correspond to image data in which the JPEG compression is carried out by means of the JPEG CODEC block 104-7.

A memory card throttle 121, as shown in FIGS. 2 and 2D fits therein a memory card (MC) removably. A built-in-memory 120 is adapted to store the photographed image data, even when the memory card (MC) is not inserted into the memory card throttle 121.

A LCD driver 117 as shown in FIGS. 2 and 2D corresponds to a drive circuit for driving a LCD monitor 10 as described below and has a function for converting the video signal outputted from the TV signal display block 104-9 into a signal for displaying on the LCD monitor 10. The LCD monitor 10 monitors a state of the subject before photographing it and displays image data stored in the memory card or built-in-memory 120 to confirm the photographed image.

A video AMP 118 as shown in FIGS. 2 and 2D corresponds to an amplifier for converting the video signal output from the TV signal display block 104-9 into an impedance of 75 Ω. A video jack 119 connects the video AMP 118 with an outside display such as a TV. In addition, a USB connector 122 corresponds to a connector for carrying out USB-connection with an outside instrument such as a personal computer.

A serial driver circuit 123-1 as shown in FIGS. 2 and 2D converts the output signal of the aforementioned serial block 104-6 into a voltage to carry out a serial communication with an outside device such as a personal computer. Further, a RS-232C connector carries out a serial connection with an outside device such as a personal computer. The SUB-CPU 109 as shown in FIGS. 2 and 2B is composed of a CPU in which ROM and RAM are contained as one chip. The SUB-CPU 109 is adapted to input the operational or output signal outputted from the operational key unit KU for the switches SW 1 to 13 and so on or the remote control light receiving part 6 into the CPU block 104-3 as user's operational information. The SUB-CPU 109 is adapted to convert a state of the camera outputted from the CPU block 104-3 into a control signal to the sub LCD 1, AF LCD 8, strobe LCD 9 and a buzzer 113 and to output it.

The sub LCD 1 as shown in FIGS. 2 and 2B corresponds to a display part for displaying, for example, a number capable of photographing. The LCD driver 111 is a circuit for driving the aforementioned sub LCD 1 based on the output signal from the SUB-CPU 109.

FIGS. 1C, 2 and 2B, the AF LCD 8 displays a state of focusing at the time of photographing and the strobe LCD 9 displays a state of charging the strobe. In addition, the AF LED 8 and strobe LED 9 may be used in the other display, such as during access of a memory card.

The operational key unit KU as shown in FIGS. 2 and 2B corresponds to a key circuit for inputting the operational signal of the operated switches into the SUB-CPU 109 when the keys, in other words, switches SW 1 to 13 as shown in FIGS. 1A and 1B are operated by the user. The remote control light receiving part 6 corresponds to a receiving part for a signal in a remote control sender operated by the user.

In FIGS. 2 and 2A, an audio recording unit 115 includes a microphone 115-3 into which the user inputs an audio signal, a microphone AMP 115-2 for amplifying the inputted audio signal and an audio recording circuit 115-3 for recording the amplified audio signal.

In FIGS. 2 and 2A, there is provided an audio play-back unit 116 having an audio play-back circuit 116-1 for converting the recorded audio signal into a signal capable of being outputted from a speaker 116-3 for outputting the audio signal, and an audio AMP 116-3 for amplifying the converted audio signal and driving the speaker.

(Operation)

Figure 4B:
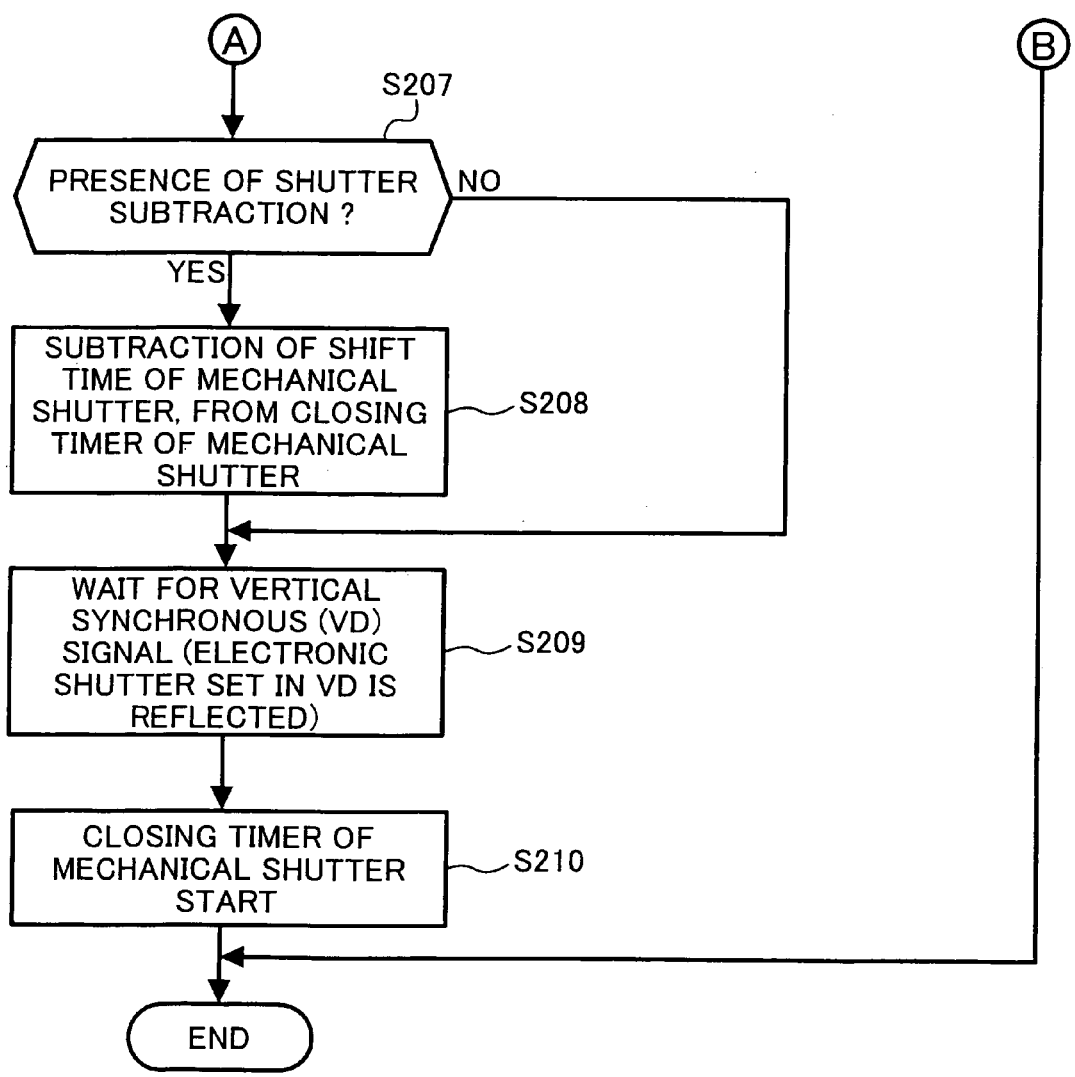
FIG. 4 is a flow chart explaining settings of the term of the electronic shutter and of closing timing of the mechanical shutter.

Next, a control operation by the CPU block 104-3 of the imaging apparatus configured as described above will be explained in connection with the flow charts as shown in FIGS. 3 and 4.

(1) A control operation with respect to a flow chart of FIG. 3

FIG. 3 shows the flow chart for explaining a computing process of a recording electronic shutter term. The control operation with respect to the flow chart will be explained below.

(Step S101)

First, in the step S101, the CPU block 104-3 decides about whether or not the release shutter SW1 is in a half-pressed state RL1. In the decision, if the release shutter SW1 is not pressed, at No, the process is completed. In the step S101, if the release shutter SW1 is in the half-pressed state RL1, at Yes, the step is shifted to a step S102.

(Step S102)

In the step S102, the CPU block 104-3 sets absence of a shutter subtraction, as information of presence or absence of the shutter subtraction and then is adapted to shift the step to a step S103.

(Step S103)

In the step S102, the CPU block 104-3 computes a recording shutter second (a speed of the recording shutter) from a brightness of the subject imaged on the CCD which is a solid-state image-sensing device, and is adapted to shift the step to a step S104.

(Step S104)

In the step S104, the CPU block 104-3 computes an electronic shutter term or a charge removing term (charge removing timing and charge removing time) from the solid-state image-sensing device, CCD 101 based on the recording shutter second computed in the step S103 and is adapted to shift the step to a step S105.

(Step S105)

In the step S105, the CPU block 104-3 judges about whether or not the recording shutter second computed in the step S103 is more a shift possible shutter second which is a shift possible shutter time. In the judgment, if the time is less than the shift possible shutter second, the process is completed at NO. If the time is more than the shift possible shutter second, the step is shifted to a step S106 at YES.

(Step S106)

In the step S106, the CPU block 104-3 subtracts from the electronic shutter term by a time computed from the shift possible shutter second and is adapted to shift the step to a step S107.

(Step S107)

In the step S107, the CPU block 104-3 carries out a setting for a shift of the shutter second which is the shutter time and terminates the process. The setting process sets a flag having a shutter subtraction as information of presence and absence of the shutter subtraction, if there is the shift possible time in the electronic shutter term. In the setting process, the brightness of the subject is measured in such a manner that the release button of the release shutter SW1 is first half-pressed. In the measurement, if the subject is dark, it is necessary to be long the exposure time. If the subject is dark, the electronic shutter term or a required time to remove the charge of the CCD 101 by the electronic shutter, becomes short for the long exposure time. Here, if there is no required time for the electronic shutter term, it is necessary to provide a flag, which does not carry out the shift in setting process in the step S107.

In the setting process in the step S107, if the subject is light, the exposure time becomes short and therefore a flag is provided by means of subtracting the shift possible time from the electronic shutter term to show a display having a subtraction.

(2) A control operation according to a flow chart shown in FIG. 4

Settings of a recording electronic shutter term and of a mechanical shutter closing timing will be explained with reference to FIG. 4. In addition, the settings of the recording electronic shutter term and mechanical shutter closing timing are carried out after the computing process of the recording electronic shutter term is performed.

(Step S201)

In the step S201, the CPU block 104-3 judges about whether or not the release shutter SW1 is first in a full-pressed state (RL2). If the release shutter SW1 is not pressed, the process is completed at NO. If the release shutter SW1 is in the full-pressed state (RL2), the step is shifted to a step 202.

(Step S202)

In the step S 202, the CPU block 104-3 controls the TG 102-4 to acquire a timing of the vertical synchronous (VD) signal inputted into the TG 102-4 from the CCD1 control block 104-1 and then is adapted to shift the step to a step 203.

(Step S203)

In the step S203, the CPU block 104-3 judges about whether or not a time until the following vertical synchronous (VD) signal is inputted into the TG 102-4 is more than a predetermined time, after the timing of the vertical synchronous signal is acquired by the TG 102-4. If this time is more than a predetermined time, then the step is shifted to a step 205 at YES. On the contrary, if the time is less than a predetermined time, the step is then shifted to a step 204 at NO.

(Step S204)

In the step S204, the CPU block 104-3 controls to hold the TG 102-4 until the following vertical synchronous (VD) signal is inputted into the TG, and shifts the step to a step 205.

(Step S205)

In the step S205, the CPU block 104-3 sets the recording electronic shutter and shifts the step to a step 206. The setting of the recording electronic shutter is carried out by means of sending serial data from the CPU block 104-3 to F/E-IC 102. In addition, the recording electronic shutter set in the step is used in the following vertical synchronous signal.

(Step S206)

In the step S206, the CPU block 104-3 sets a closing timer of the mechanical shutter and is adapted to shift the step to a step S207. The setting of the closing timer of the mechanical shutter is carried out by set of a time until the mechanical shutter 7-4a is closed by means of timer interrupt of the CPU block 104-3. The time until the mechanical shutter 7-4a is closed is written on the program and is stored in the ROM 107.

(Step S207)

In the step S207, the CPU block 104-3 reads out the information of presence and absence of the shutter subtraction set in the flow as shown in FIG. 3 and judges the presence and absence of the shutter subtraction. In the judgment, if the shutter subtraction is absent, the step is shifted to a step S209 at NO. If the shutter subtraction is present, the step is shifted to a step S208 at YES.

(Step S208)

In the step S208, the CPU block 104-3 subtracts a shift time of the mechanical shutter from the closing timer of the mechanical shutter set in the step S206 and then resets subtraction results to the closing timer of the mechanical shutter. The shift time of the mechanical shutter is written on the program and is stored in the ROM.

(Step S209)

In the step S209, the CPU block 104-3 causes the step to shift to a step S210, waiting that the vertical synchronous (VD) signal is inputted into the TG 102-4 to wait the reflection of the set electronic shutter.

(Step S210)

In the step S210, the CPU block 104-3 completes, when the vertical synchronous (VD) signal is inputted into the TG 102-4, the process by initiation of the timer interrupt. In addition, the mechanical shutter 7-4a is adapted to close after the time set in the step S206 or S208 is lapsed.

Herein, although the description is made with respect to the case that the release shutter SW1 is pressed separately into the half-pressed and full-pressed states, respectively, if the release shutter SW1 is full-pressed at once without half-pressed, the process described in connection with FIGS. 3 and 4 is continuously carried out.

Figure 5:
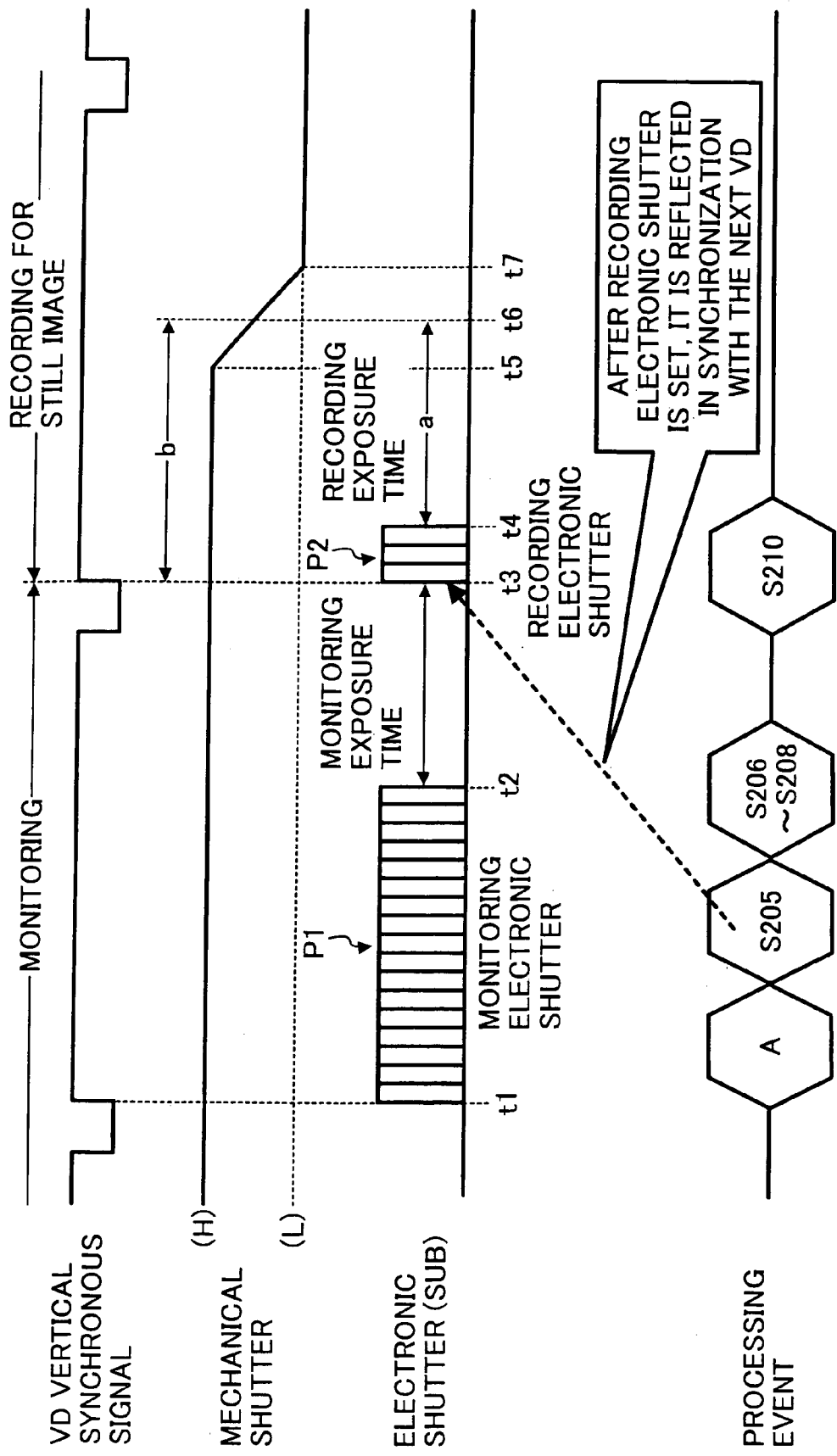
FIG. 5 is a timing chart based on the flow chart shown in FIG. 4.

In FIG. 5, the VD vertical synchronous signal, mechanical shutter, electronic shutter and processing event by the flow chart shown in FIG. 4 are shown in turn from an upper portion in FIG. 5.

Here, in the mechanical shutter shown in FIG. 5, the mechanical shutter 7-4a in FIGS. 1 and 1A shows a term of open with a high level H. The electronic shutter is operated at the time that pulses P1 and P2 are outputted.

The timing chart shown in FIG. 5 shows an operation of the mechanical shutter 7-4a in FIGS. 1 and 1A, from the opening to the closing. The timing chart also shows separately each of modes of monitoring and of still image recording.

First, in the term of monitoring, the electronic shutter discharges the charge of the CCD 101 by operating continuously only during outputting a pulse P1 from a start time t1 of the vertical synchronous (VD) signal, in accordance with the exposure amount of monitoring.

In other words, the F/E Front end)-IC 102 renders a function of the electronic shutter that the F/E-IC 102 has at the time t1 to turn ON to discharge the charge of the CCD 101 during the times t1 to t2. Subsequently, the F/E-IC 102 turns off the electronic shutter at the time t2 and causes the exposure of monitoring to initiate. The ON and OFF times of the electronic shutter are set in the F/E-IC 102 by the CPU block 104-3 prior to the timing shown in FIG. 5.

Moreover, the CPU block 104-3 carries out the charging to the CCD 101 during the times t2 to t3 by light from the subject inputted in the CCD 101 through the zoom lens 7-1a and the focus lens 7-2a. In addition, the time t3 corresponds to a time of timing for generating the following vertical synchronous (VD) signal by means of the TG 102-4.

During operating the monitoring as described above, when the release shutter SW1 becomes in the full-pressed state RL2 by operation of the user, the processing event A is generated. When the processing event A is generated, the CPU block 104-3 sets an output term of the electronic shutter for recording the still image in the F/E-IC 102 and then carries out an arithmetic process for the closing timer of the mechanical shutter in the steps S206 to S208.

In other words, after the setting process for the closing timer of the mechanical shutter is carried out in the step S206, if there is made judgment that the subtraction of the shutter speed is present in the step S207, the shift time or a predetermined time of the mechanical shutter is subtracted from the closing time of the mechanical shutter, in the step S208.

Also, the F/E-IC 102 is controlled in synchronization with the following vertical synchronous (VD) signal that the TG 102-4 outputs in the time t3 to turn on the function of the recording electronic shutter and to discharge the charge of the CCD 101 during the times t3 to t4 (during the pulse P2) which correspond to the term set in the aforementioned step S205.

Simultaneously, the CPU block 104-3 starts the closing timer of the mechanical shutter in the step S210, in the time t3.

Next, the F/E-IC 102 turns off the electronic shutter in the time t4 and starts an exposure of the still image. The CPU block 104-3 starts the closing operation of the mechanical shutter 7-4a in a time t5 by controlling the motor 7-4b of the mechanical shutter through the motor driver 7-5 in the time t5 when the closing timer of the mechanical shutter is in a set time and shields light entering in the CCD 101 from the subject. A time t7 corresponds to a time that the mechanical shutter 7-4a closes completely.

As a result, the charging to the CCD 101 is carried out during the times t4 to t7 by the light entered in the CCD 101 through the zoom lens 7-1a and focus lens 7-2a from the subject. However, because the times t5 to t7 correspond to times that the operation of closing the mechanical shutter is performed, the charging or recording exposure time to the CCD 101 is substantially carried out in the times t4 to t6. This is for a reason that the exposure time during closing the mechanical shutter corresponds to an area of a lower triangle between the times t5 and t7, while an area of an upper triangle between the times t5 and t7 is equal with that of the lower triangle shape (see FIG. 6).

Figure 6A:
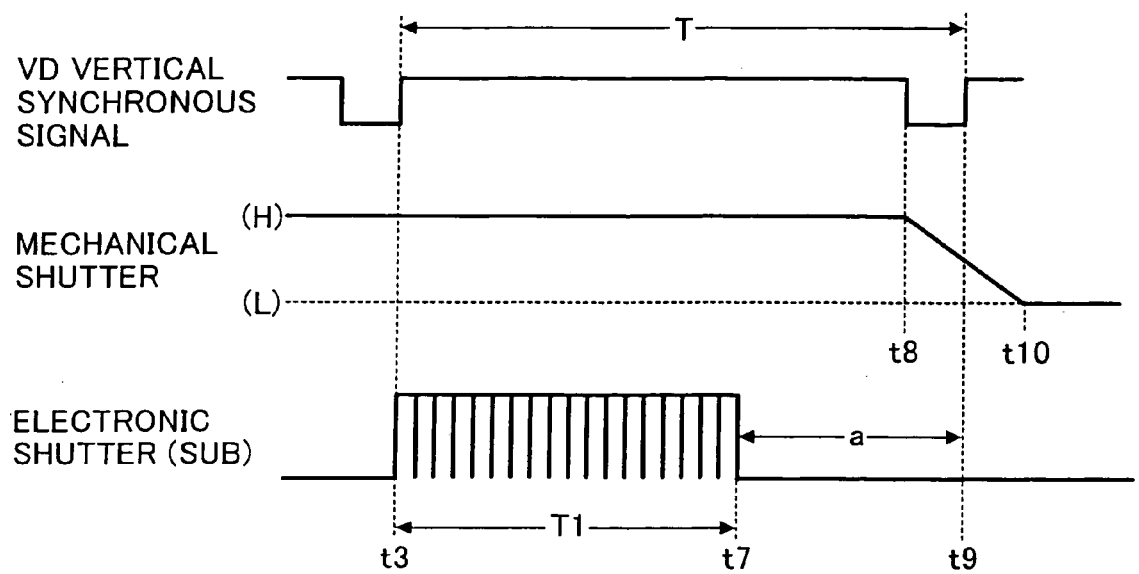
FIG. 6A is a timing chart of a conventional non-shutter timing shift.

In FIG. 6A, the electronic shutter operates and the charge of the CCD is discharged so that an exposure time a decided by a brightness of the subject during the term in which the vertical synchronous (VD) signal is inputted in the TG 102-4 is provided. Consequently, a release time lag becomes large at that rate. In FIGS. 6A and B, the exposure time a is set to become the same.

Figure 6B:
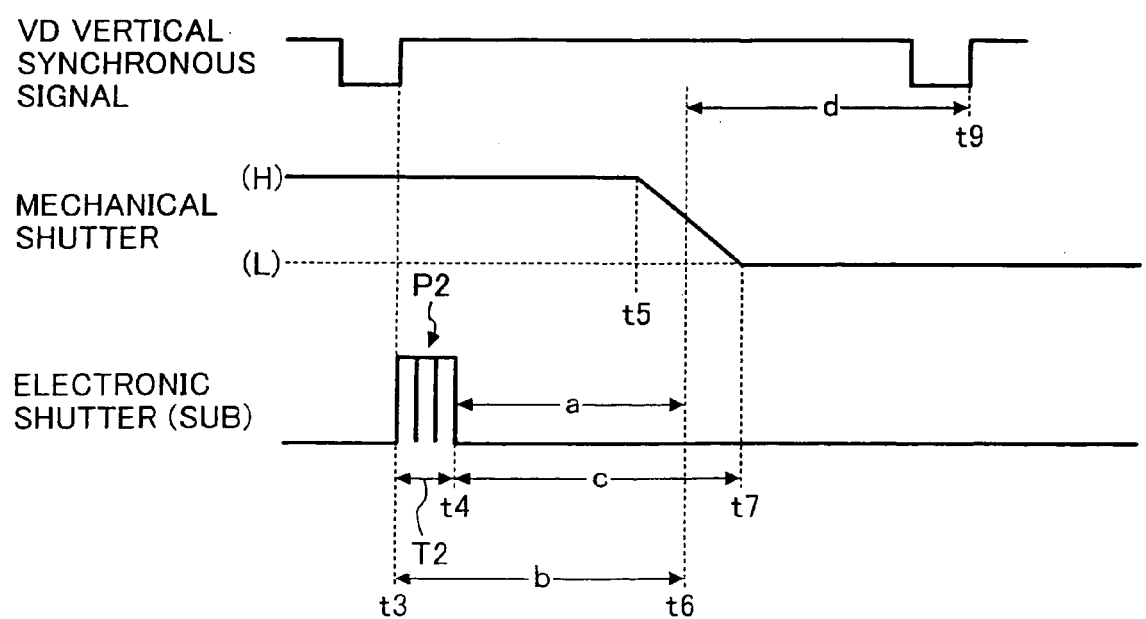
FIG. 6B is a timing chart in case of having a shutter timing shift in the present invention.

In FIG. 6B, b denotes a shift possible shutter second, c an electronic shutter shift time, d a shift time of the mechanical shutter. Also, T denotes a term until the vertical synchronous (VD) signal is inputted in the TG 102-4 in a time t9 after the signal is inputted in the TG in the time t3, T1 and T2 denote electronic shutter terms.

In FIG. 6A, the shutter 7-4a shown in FIGS. 1 and 1A starts an operation of closing in a time t8 to close completely in a time t10. Here, the exposure time a becomes substantially a distance from the time t7 to the time t9 which is a middle or half between the time t8 and a time t10. In this case, because the exposure time a is the same in FIGS. 6A and B, if the shift possible shutter second b is half of the term T (times t3 to t9) to the following vertical synchronous (VD) signal, a position of the middle time t9 shown in FIG. 6A is shifted in an earlier direction by the shift time d of the mechanical shutter, which is the same as the shift possible shutter second b. In other words, the position of the middle time t9 in FIG. 6A is shifted to a position of the time t6 in FIG. 6B.

The middle time of the operation of closing the shutter 7-4a in FIGS. 1 and 1A can be shifted to the time t7 by subtracting the shift time d of the mechanical shutter from the middle time t9 of the operation of closing the mechanical shutter in FIG. 6A.

The electronic shutter term T2 in FIG. 6B is obtained by subtracting he shift time c of the electronic shutter which is the same time to the shift time d of the mechanical shutter from the electronic shutter term T1 in order to shift the middle time of the operation of closing the shutter 7-4a from the position of the middle time t9 in FIG. 6A to the position of the time t6 in FIG. 6B, because the exposure time a is the same together in FIGS. 6A and B.

Hereby, the electronic shutter term T2 in FIG. B becomes short fully than the electronic shutter term T1 in FIG. 6A.

As shown clearly in FIG. 6, it is understood that if the exposure time is the same, the time of the electronic shutter becomes short by the shift time c of the electronic shutter, therefore the release time lag becomes short by the shift time d of the mechanical shutter.

In addition, the substantial exposure time for recording the still image corresponds to the recording exposure time a, in other words, it corresponds to a time from the time t7 at which the electronic shutter term T1 is completed to the middle time t9 between the time t8 at which the shutter 7-4a is started to close and the time t10 at which the shutter is completed to close, in FIG. 6A, and corresponds to a time from the time t4 at which the electronic shutter term T2 is completed to the middle time t6 between the time t5 at which the shutter 7-4a is started to close and the time t7 at which the shutter is completed to close, in FIG. 6 B.

By the way, as described above, if the shutter speed is fast, the exposure time for recording the image becomes short. Therefore, if the exposure time is less than a time of about half of the vertical synchronous signal representing a recording term of one frame, it is possible to hasten the electronic shutter term and timing of the mechanical shutter by shifting. So, if the shutter speed for recording the subject is more than a predetermined time or predetermined shutter second, it is preferable to shorten the release time lag as a whole by shifting the electronic shutter term and from a state thereof by initiating the timing of the mechanical shutter 7-4a.

Therefore, based on the above consideration, the imaging apparatus in the embodiment according to the present invention comprises a device for discharging charge or the F/E-IC 102 for discharging charge accumulated in an imaging device or the CCD 101 and for canceling exposure in a discharging term of the charge, a light shielding device or the mechanical shutter unit 7-4 for the mechanical shutter, which shields light by the mechanical shutter 7-4a, and a control device or the CPU block 104-3 for hastening by a predetermined time the charge discharging term of the CCD 101 in the discharging device 102 and the light shielding timing of the mechanical shutter 7-4a in the light shielding device 7-4, when the shutter speed for recording the subject is more than a predetermined time.

With the structure, if the shutter speed for recording the subject is more than a predetermined time, because the electronic shutter term is shifted and from its state, the timing of the mechanical shutter is 7-4a is started, it is possible to shorten the release time lag and prevent an upper limit in a high speed side of the shutter second from being limited by means of a performance of the mechanical shutter 7-4a.

In addition, in the imaging apparatus in the embodiment according to the present invention, the predetermined shutter second or predetermined time corresponds to a time of about half of the term of the vertical synchronous signal representing the image recording term of one frame.

In other words, if the shutter second or predetermined time is late and an exposure time more the half of the term of the vertical synchronous signal is required, the electronic shutter term is not acquired because of lacking of the time computed from the shift possible shutter second or predetermined time. Accordingly, the shutter second or predetermined time may be a time corresponding to approximately the half of the term of he vertical synchronous signal.

By providing such construction, namely, condition or setting, the shutter second or predetermined time corresponds to approximately the half time of the term of the vertical synchronous signal and therefore time of indicating the operation of the mechanical shutter 7-4a can be hastened by shortening the electronic shutter term.

Further, in the imaging apparatus in the embodiment, the shutter second or predetermined time corresponds to the charge discharging term of the CCD computed from the predetermined shutter second.

Consequently, if the exposure time is subtracted from the half time of term of the vertical synchronous signal, the shortened charge discharging term is computed and by starting the timer of the mechanical shutter from the state, the mechanical shutter 7-4a is closed to shorten a time to the completion of exposure.

In addition, although a termination time of the term T1 in FIG. 6A and the time t7 in FIG. 6A are illustrated to be the same for explanatory convenience, the termination time of the term T1 in FIG. 6A may not be the same to the time t7 in FIG. 6B. For example, the termination time of the term T1 in FIG. 6A may be earlier than the time t7.

With the construction, namely, condition or setting, it is possible to shorten the release time lag because the mechanical shutter is closed by initiation of the timer of the mechanical shutter 7-4a with the computed charge discharging term.

An imaging method according to the present invention comprises a step for discharging charge accumulated in an imaging device and for canceling exposure of a term for discharging and a step for shielding light by a mechanical shutter. In the imaging method, if a shutter second for recording a subject corresponds to a time which is less than about half of a term of a vertical synchronous signal representing an image recording term of one frame, the charge discharging term of the imaging device in the charge discharging step and the light shielding timing of the mechanical shutter in the light shielding step are adapted to hasten by a charge discharging term computed from the about half time of the term of the vertical synchronous signal.

According to the this construction, similarly to the above, if the shutter speed for recording the subject is more than a predetermined time, because the electronic shutter term is shifted and from its state, the timing of the mechanical shutter is 7-4a is started, it is possible to shorten the release time lag and prevent an upper limit in a high speed side of the shutter second from being limited by means of a performance of the mechanical shutter 7-4a.

There is provided a control system capable of controlling the aforementioned imaging method by a computer. The control system shields light by the mechanical shutter 7-4a after the charge accumulated in the imaging device is discharged and the exposure of the discharged term is cancelled.

Moreover, in the control system, if a shutter second for recording a subject corresponds to a time which is less than about half of a term of a vertical synchronous signal representing an image recording term of one frame, the charge discharging term of the imaging device in the charge discharging step and the light shielding timing of the mechanical shutter in the light shielding step are controlled to be hastened by a charge discharging term computed from the about half time of the term of the vertical synchronous signal.

In addition, a program programmed by the control system may be a type in which the computer is readable. For example, the program of this control system is programmed by use of C and BASIC languages to be readable by the computer.

Accordingly, a recording medium according to the present invention records the program in the imaging method as described above by means of the type readable by the computer.

In addition, the object of the present invention is accomplished by supplying the recording medium in which a soft ware program or program code is recorded to an apparatus, reading out and carrying out the program code stored in the recording medium by a computer of the apparatus.

From the above, the present invention makes it possible to achieve a function of the program or program code read out from the recording medium and thus to configure the recording medium for storing the program code.

What is claimed is:

1. An imaging apparatus comprising:
   a charge discharging device configured to discharge charge accumulated in an imaging device for a term and for canceling exposure in the term for discharging the charge;
   a mechanical shutter configured to shield light,
   a control device configured to control the discharging term for discharging the charge and a shielding timing of the mechanical shutter device,
   wherein the control device includes a computing device for measuring a brightness of a subject and computing an exposure time for recording the subject from the measured brightness, and comparing the computed exposure time with an image recording term of one frame, if the computed exposure time is shorter than the image recording term of one frame, the discharging term is shortened and the shielding timing is hastened under the control of the control device.

2. The imaging apparatus according to claim 1, wherein the computed exposure time is shorter than half time of the image recording term of one frame.

3. A method for imaging a subject, comprising the steps of:
   discharging charge accumulated in an imaging device for a term and canceling exposure in the term for discharging the charge;
   shielding light by a mechanical shutter device;
   measuring brightness of a subject and computer an exposure time for recording the subject from the measured brightness,
   controlling the discharging term for discharging the charge and a shielding timing of the mechanical shutter device,
   wherein the computed exposure time is compared with an image recording term of one frame, and the discharging term for discharging the charge is shortened and the light shielding timing of the mechanical shutter device is hastened, if the computed exposure time for recording the subject is shorter than the image recording term of one frame.

4. A recording medium for recording a program to perform said imaging method as recited in claim 3, the program being readable and executable by a computer.

5. The method for imaging a subject according to claim 4, wherein
   the computed exposure time is shorter than half of the image recording term of one frame.

6. A recording medium for recording a program to perform said imaging method as recited in claim 5, the program being readable and executable by a computer.

* * * * *